United States Patent

[11] 3,582,984

[72] Inventor Hiromichi Kurokawa
       Kanagawa-ken, Japan
[21] Appl. No. 795,881
[22] Filed Feb. 3, 1969
[45] Patented June 1, 1971
[73] Assignee Sony Corporation
       Tokyo, Japan
[32] Priority Feb. 5, 1968
[33]         Japan
[31]         43/7044

[54] COLOR VIDEO SIGNAL GENERATING APPARATUS
8 Claims, 10 Drawing Figs.
[52] U.S. Cl. ................................................. 178/5.4,
                                                              350/162
[51] Int. Cl. ................................................ H04n 9/06
[50] Field of Search ................................... 178/5.4, 5.4
                                                               (STC)

[56]                    References Cited
                UNITED STATES PATENTS
2,853,547   9/1958   Perilhou ........................ 178/5.4STC Primary Examiner—Richard Murray
Assistant Examiner—Peter M. Pecori
Attorneys—Albert C. Johnston, Robert E. Isner, Lewis H. Eslinger and Alvin Sinderbrand ABSTRACT: In a color video signal generating apparatus in which an objective lens projects an image of an object to be reproduced onto the photoconductive layer of a vidicon tube, color filters having stripelike filter regions of different wavelength band characteristics and a lens screen having cylindrical lenses extending parallel to the stripelike filter regions are arranged in sequence between the objective lens and the photoconductive layer with each color filter being disposed to satisfy the equation $$1 + \frac{l}{b} = \frac{d}{A}\gamma',$$

in which $l$ is the distance from the respective color filter to the lens screen, $b$ is the distance from the lens screen to the photoconductive layer, $d$ and $A$ are respectively the pitches of the filter regions of the respective color filter and of the lenses of the lens screen, and $\gamma'$ is a positive integer, and further the distances of the color filters from the lens screen and the pitches of the respective filter regions on the color filters are selected so that the images of the filter regions of each color filter projected by the cylindrical lenses on the photoconductive layer have pitches different from those of the images of the filter regions of the other color filters.

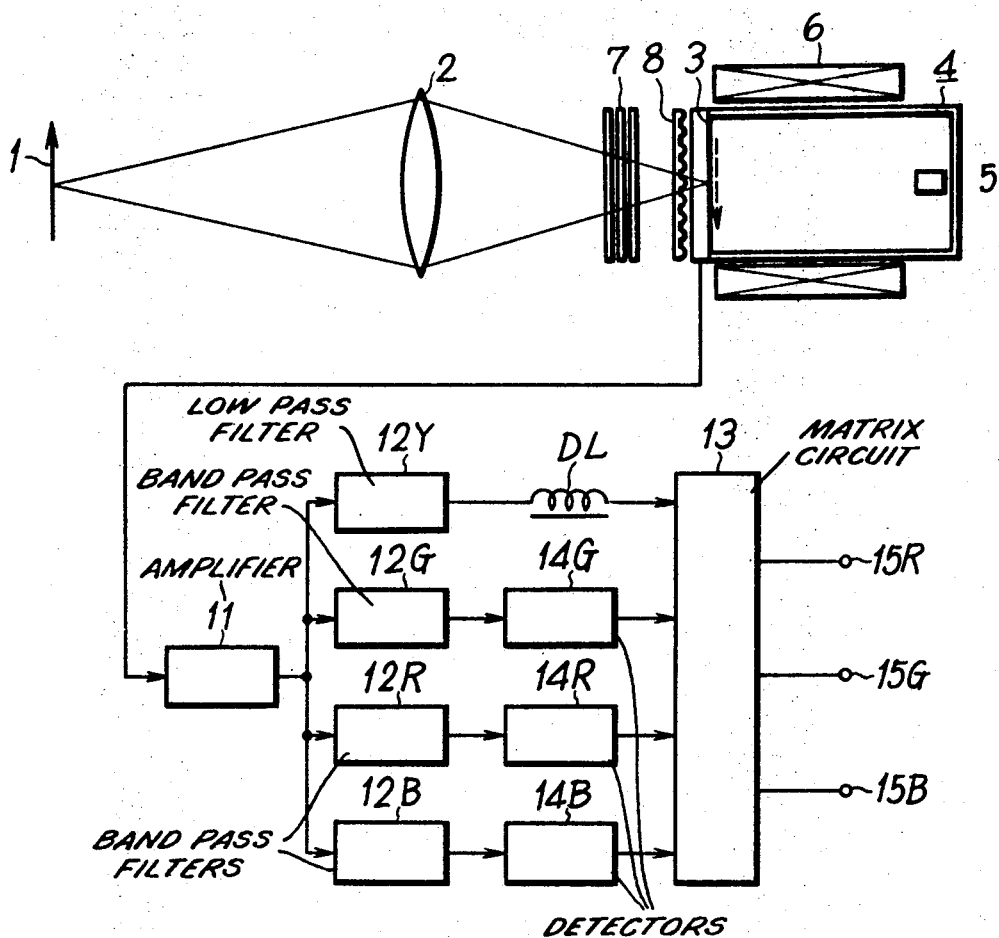

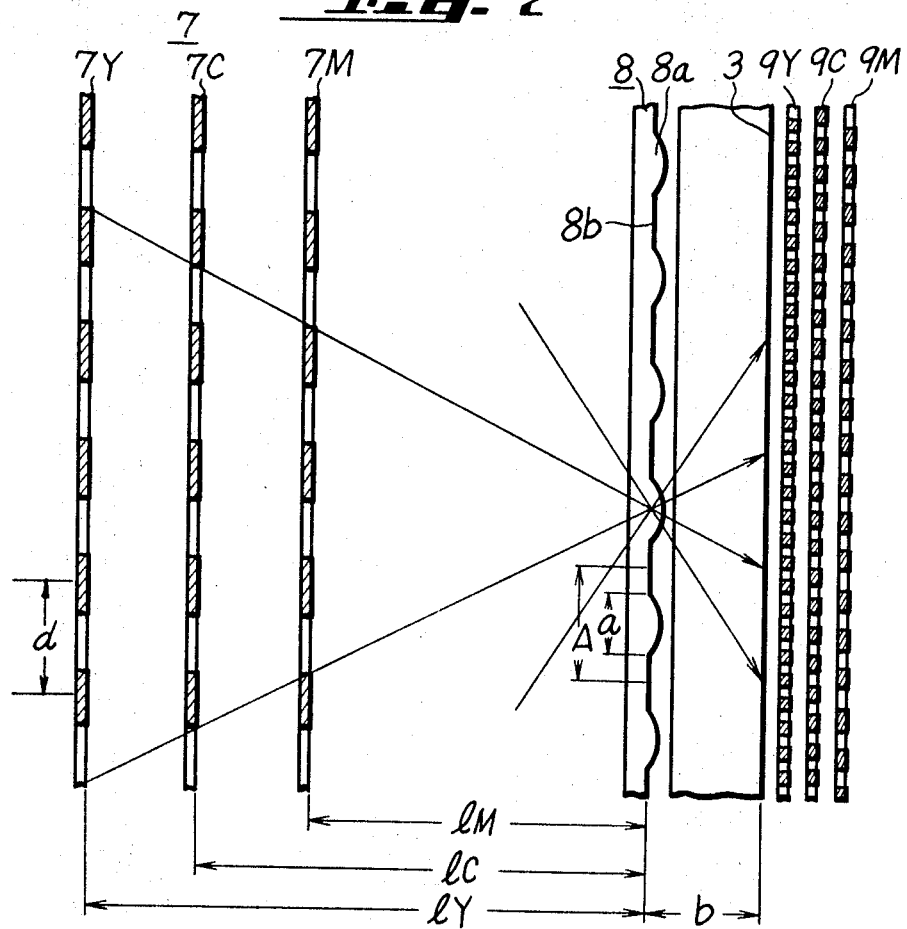
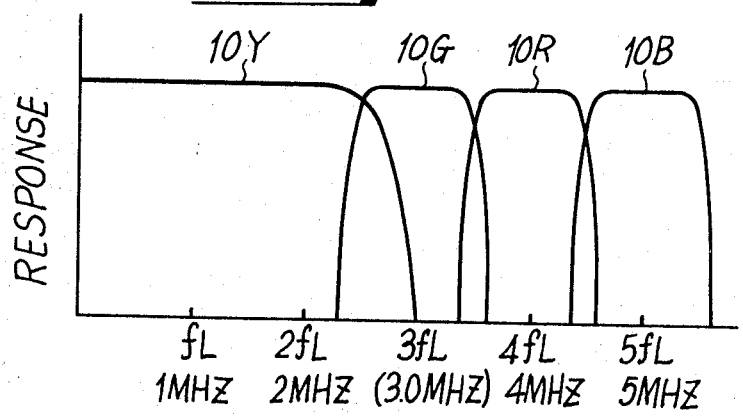

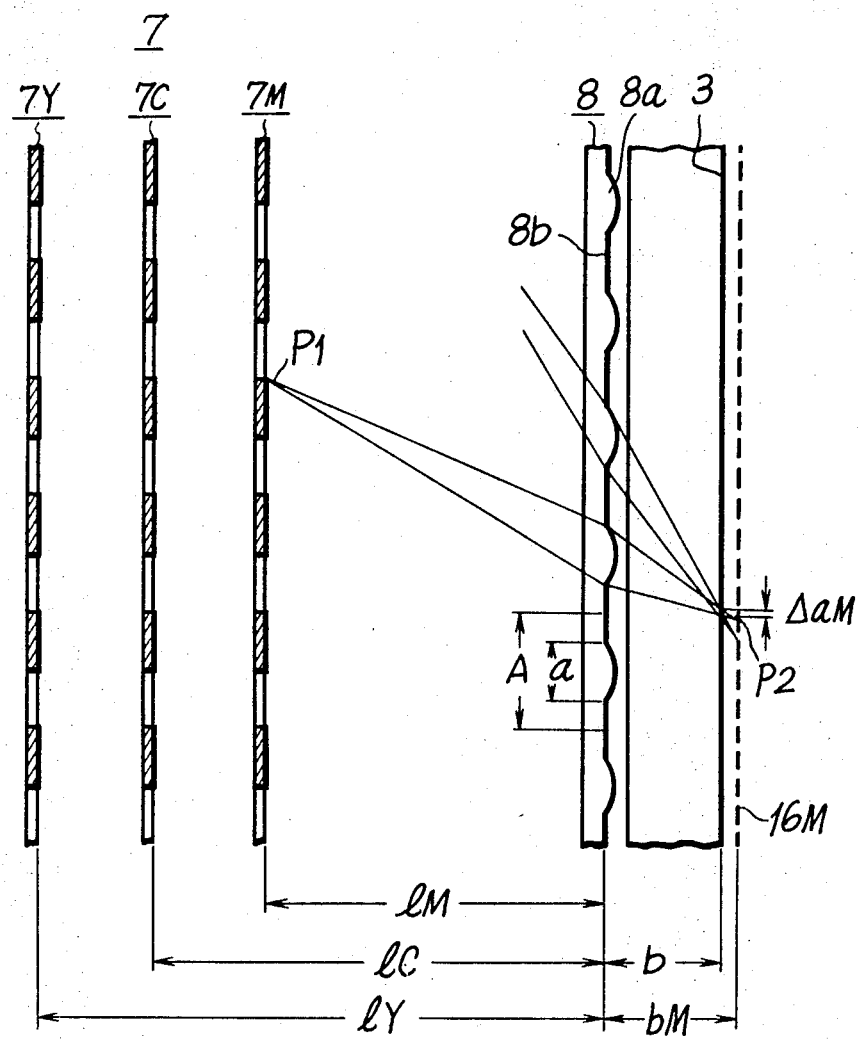

INVENTOR.
HIROMICHI KUROKAWA

ATTORNEY

COLOR VIDEO SIGNAL GENERATING APPARATUS

This invention relates generally to a color video signal generating apparatus.

Systems have been proposed in which the color components of an object to be televised are separated into individual color components by means of a lens screen having a plurality of cylindrical lenses. In one of such systems, for example, as disclosed in a copending application for United States Letters Patent, Ser. No. 657,139, filed July 31, 1967 now Pat. No. 3,502,799, assigned to the same assignee as this application, the object being televised is focused onto the photoconductive layer of an image pickup tube, for example, a vidicon tube, by means of an objective lens, while, at the same time, the image of a color filter located between the objective lens and the object is projected onto the lens screen by the objective lens, with the result that the image of the color filter is also formed on the photoconductive layer by the cylindrical lenses. Consequently, the object is focused into an image on the photoconductive layer while being separated into respective color components. Although the above system permits production of a color video signal of high resolution from the image pickup tube, it allows the image of the color filter to become out of focus when the objective lens is shifted so as to bring the image of the object being televised into focus. Further, such optical aberrations as are present in the objective lens will distort the image of the color filter. It is also very difficult to produce a color filter in which the filter regions thereof corresponding to the color components of the object have small pitches, and where the filter regions have such small pitches, they are likely to lead to the possibility of causing interference fringes.

The present invention has for its object the elimination of the aforementioned difficulties experienced in the prior art.

In accordance with this invention, the mentioned difficulties are avoided by interposing a color filter between the objective lens and the lens screen and focusing the image of the color filter onto the photoconductive layer of the image pickup tube only by means of the cylindrical lenses of the lens screen while being separated into individual color components.

Another object of this invention is to provide a color video signal generating apparatus in which a plurality of color filters are interposed between an objective lens and a lens screen, with at least one of the color filters disposed at a different location from the others.

Another object of this invention is to provide a color video signal generating apparatus with which it is possible to produce a color video signal with relatively small optical aberrations.

Another object of this invention is to provide a color video signal generating apparatus which is provided with a color filter that is easy to manufacture.

Still another object of this invention is to provide a color video signal generating apparatus by which a color video signal can be produced with high resolution regardless of any shifting of the objective lens.

The above, and other objects, features and advantages of this invention will become apparent from the following description of illustrative embodiments which is to be read in conjunction with the accompanying drawings, in which:

FIG. 1 is a diagrammatic view schematically illustrating a color video signal generating apparatus according to one embodiment of this invention;

FIG. 2 is a schematic enlarged view showing the color filter assembly and its image, as produced in the embodiment of FIG. 1;

FIG. 3 is a characteristic curve showing frequency bands of the various signals obtained from the apparatus of FIG. 2;

FIG. 4 is a schematic diagram hereinafter referred to for explaining defocusing of the image of one of the color filters in the embodiment of FIG. 2;

Figure 6:
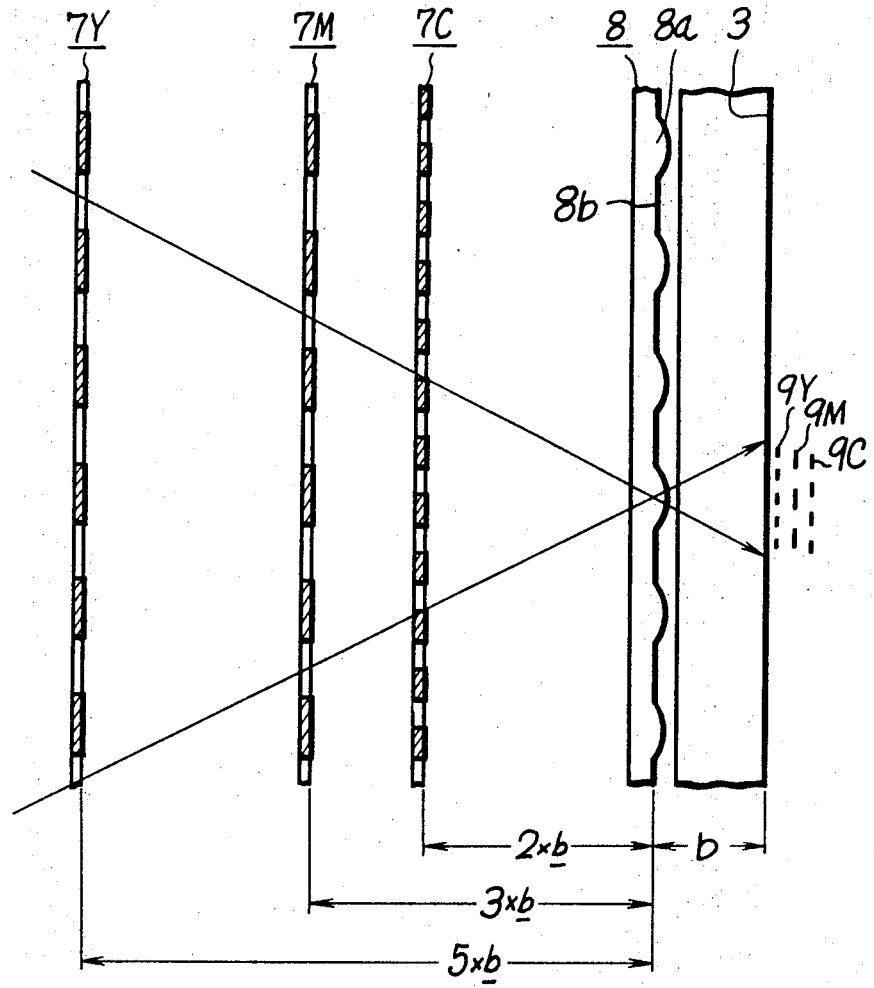
Figure 7:
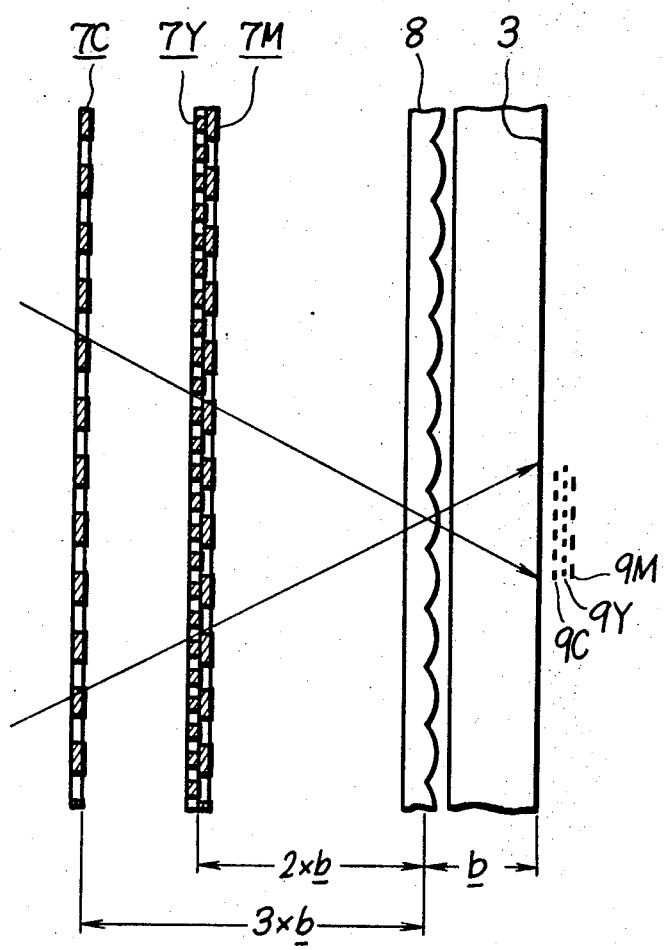
Figure 8:
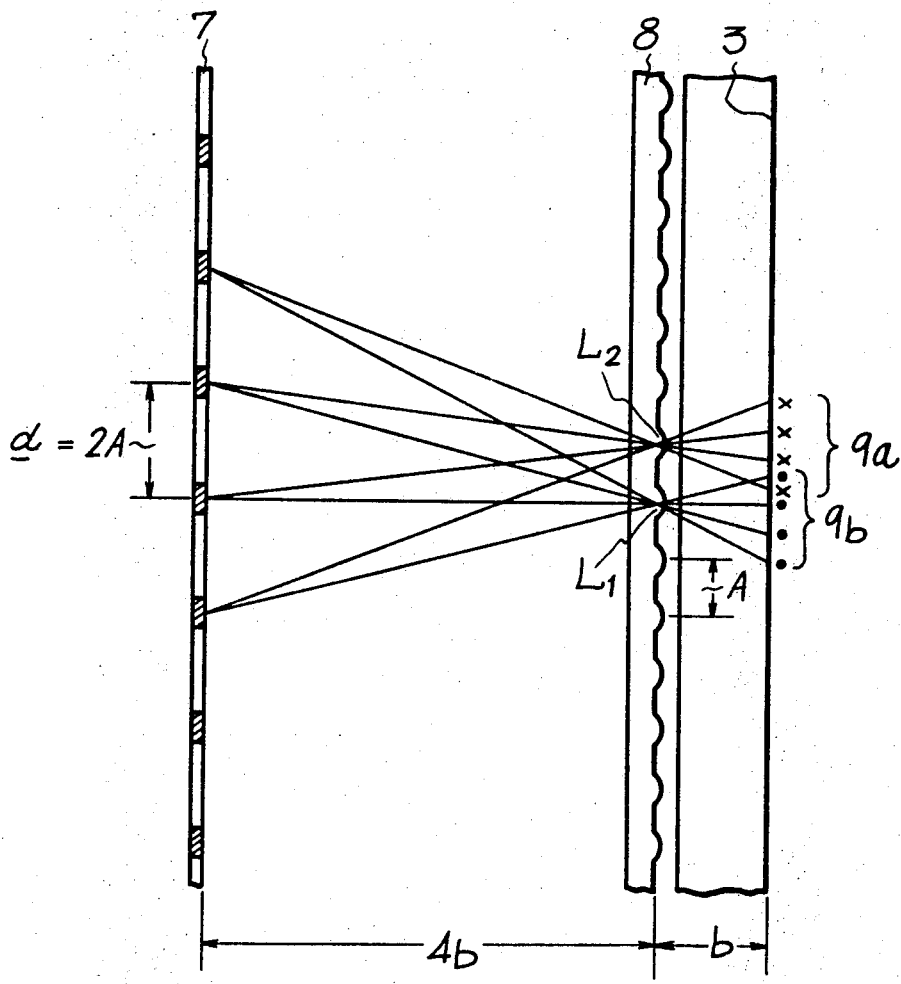
Figure 9:
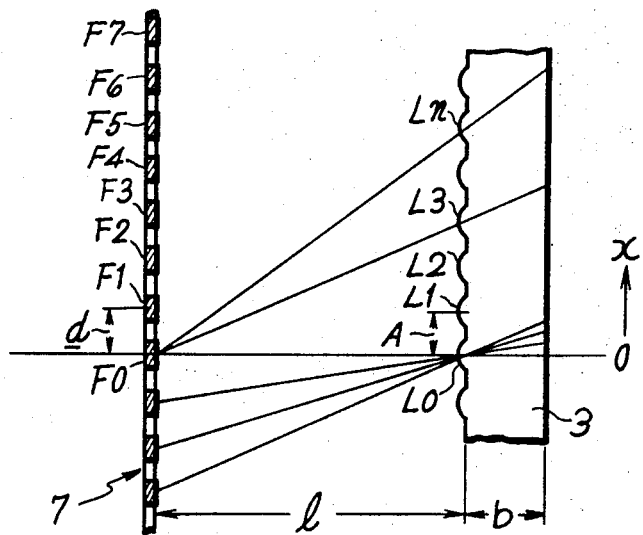
Figure 10:
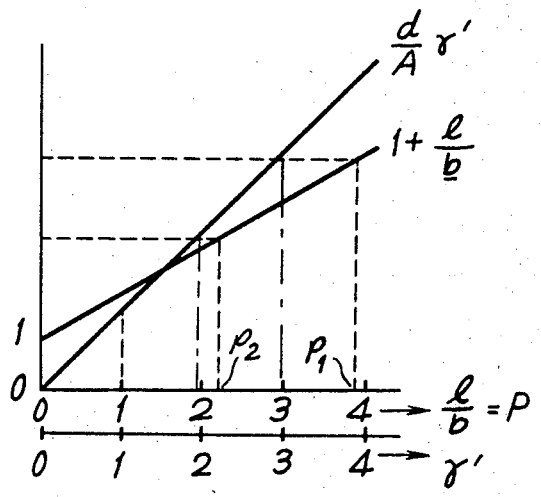

FIGS. 6 to 8, inclusive, are schematic diagrams showing modifications of the principal part of the apparatus according to this invention;

FIG. 9 is a schematic diagram referred to hereinafter for explaining the positioning of the image of the color filter and its focusing; and FIG. 10 is a graph showing a general solution for image focusing.

Referring to FIG. 1 in detail, it will be seen that, in the embodiment of the invention there illustrated, an object 1 to be televised is focused into an image on a photoelectric conversion layer 3 of an image pickup tube 4 by an objective lens 2. The image pickup tube 4 may be, for example, a vidicon tube in which layer 3 is photoconductive. An electron gun 5 is disposed adjacent the end of vidicon tube 4 remote from photoconductive layer 3 and an electron beam deflection unit 6 is disposed on the outside of the vidicon tube 4. On an optical path between objective lens 2 and photoconductive layer 3 there are located a plurality of striped color filters of different wavelength band characteristics, as generally indicated by 7, and a lens screen 8 consisting of a plurality of cylindrical lens spaced at regular intervals. In this embodiment of the invention, the pitches of the stripes of color filters 7 and the cylindrical lenses of lens screen 8 are selected to have a specific relationship to each other. Further, the optical distance between lens screen 8 and photoconductive layer 3 and that between lens screen 8 and striped filters 7 are also selected in a specific relationship to each other and, in addition, the striped filters are disposed at different distances from the lens screen 8.

As shown particularly on FIG. 2, color filters 7 include a striped color filter 7Y consisting of stripelike color filter regions arranged at regular intervals which permit primarily the passage of yellow color light therethrough, a striped color filter 7C consisting of stripelike color filter regions of the same pitch and width as the filter regions of filter 7Y and which permit primarily the passage of cyan color light therethrough, and a striped color filter 7M similarly consisting of stripelike color filter regions which permit primarily the passage of magenta color light therethrough and which are arranged at the same pitch and width as the other filter regions. In each of the color filters, the filter regions are spaced from each other by transparent portions interposed therebetween. These striped color filters 7Y, 7C and 7M are arranged in side-by-side relation in a direction from object 1 to photoconductive layer 3 so that their stripelike color filter regions are parallel to each other. Further, the lens screen 8 comprises an alternate arrangement of cylindrical lenses 8a and flat, nonlens portions 8b and is positioned adjacent photoconductive layer 3.

If the distance from the lens screen 8 to a color filter is taken as $l$, the distance from lens screen 8 to photoconductive layer 3 is taken as $b$ and $l/b=P$ ($P$ being a positive integer), there is formed on photoconductive layer 3 an image of the striped color filter from which can be derived a signal of an output frequency which is $P$ times the product of a line scanning frequency $f$ and the number L of the cylindrical lenses 8a or flat portions 8b of the lens screen 8. Thus, if the pitch of cylindrical lenses 8a is taken as A, there is formed on photoconductive layer 3 an image of the striped color filter of a pitch of A/P. Consequently, if the distances from the lens screen 8 to the striped color filters 7Y, 7C and 7M are taken as $lY$, $lC$ and $lM$ and if $lY/b=5$, $lC/b=4$ and $lM/b=3$, images of the yellow, cyan and magenta color filters 7Y, 7C and 7M are respectively formed on photoconductive layer 3, as indicated by 9Y, 9C and 9M, at pitches of A/5, A/4 and A/3, and the frequencies of output signals produced by scanning these images are respectively 5$fL$, 4$fL$ and 3$fL$. As a result of this, the image of the object 1 is formed on photoconductive layer 3 while being separated into respective color components by striped color filters 7Y, 7C and 7M.

Upon electron beam scanning of photoconductive layer 3 across the stripes of the color-separated image of the object, there are derived from the image pickup tube 4 a signal 10G (FIG. 3) for green color centered on a frequency of 3$fL$ corresponding to the image 9M of the magenta color filter 7M which is complementary of green, a signal 10R for red color centered on a frequency of 4$fL$ corresponding to the image 9C of the cyan color filter 7C which is complementary to red, and a signal 10B for blue color centered on a frequency of $5f_L$ corresponding to the image 9Y of the yellow color filter 7Y which is complementary to blue. Further, a luminance signal 10Y of the object 1 is produced between zero to $3f_L$ by the presence of flat, nonlens portions 8b of the lens screen 8. In this case, it is of course possible to vignette the image of the object 1 in its entirety as by slightly roughening the surface of each flat, nonlens portion 8b of the lens screen, for example, as shown in the copending application for United States Letters Pat. Serial No. 657,139, filed July 31, 1967, assigned to the same assignee as this application, so as to cut off the high-frequency component of the luminance signal to such an extent that the frequency band of the luminance signal may not overlap the color signal frequency bands.

As shown on FIG. 1, the output of image pickup tube 4 may be fed, after passage through an amplifier 11, to a low-pass filter 12Y for separation of the luminance signal and to bandpass filters 12G, 12R and 12B for separation of the green, red and blue signals. The output of low-pass filter 12Y is applied through a delay line DL to a matrix circuit 13 and the outputs of the band-pass filters 12G, 12R and 12B are respectively fed to detector circuits 14G, 14R and 14B, the detected outputs of which are then applied to the matrix circuit 13, thus deriving red, green and blue signals from output terminals 15R, 15G and 15B, respectively, of matrix circuit 13. The delay line DL interposed between filter 12Y and matrix circuit 13 is for synchronizing the luminance signal with the other color signals.

It will be apparent that, when one of color filters 7Y, 7M and 7C is positioned to be accurately focused into an image or layer 3, the images of the other color filters are a little out of focus if such other color filters are spaced from the color filter having its image focused on layer 3. For example, in view of the resolution of lens screen 8 and the image pickup tube 4, the yellow filter 7Y whose image has the highest frequency is positioned to be focused into an image with the highest accuracy. For this purpose, if the focal length of the cylindrical lenses 8a is F and $$\frac{1}{lY} + \frac{1}{b} = \frac{1}{F} \quad (1)$$

the yellow color filter 7Y can be accurately focused into an image or layer 3. In such case, the image surface $16_M$ (FIG. 4) at which the image of the magenta color filter 7M is in focus, is formed at a position spaced the distance $b_M$, rather than the distance b, from the lens screen 8. Therefore, a real image of a point $P_1$ on, for example, the magenta color filter 7M, is formed at a point $P_2$ on image surface 16M by a cylindrical lens $8a_1$, so that the image on the photoconductive layer 3 is defocused by $\Delta a_M$. The distance $b_M$ from lens screen 8 to image surface 16M can be given by the following equation:

$$\frac{1}{lM} + \frac{1}{b_M} = \frac{1}{F} \quad (2)$$

Accordingly, the defocusing $\Delta a_M$ can be given by the following equation:

$$\Delta a_M = ax \frac{b_M - b}{b_M} \quad (3)$$

where $a$ is the width of each cylindrical lens 8a.

From these equations (1), (2) and (3), it follows that $$\Delta a_M = a \left( \frac{1}{m} - \frac{1}{n} \right)$$

where $$m = \frac{lM}{b} \text{ and } n = \frac{lY}{b}.$$

Since the pitch of the image 9M of the magenta color filter 7M is $\frac{A}{m}$, the ratio of the defocusing $\Delta a_M$ to the pitch is given by the following equation:

$$\frac{\Delta a_M}{\frac{A}{m}} = \frac{a}{A} \left( 1 - \frac{m}{n} \right)$$

Generally, a function $f'(x)$ that a function $f(x)$ of a period T has been defocused by $\Delta x$ is given by the following equation:

$$f'(x) = \int_{x - \frac{\Delta x}{2}}^{x + \frac{\Delta x}{2}} \frac{1}{\Delta x} f(x) dx$$

and if the Fourier expansion of the above equation is as follows:

$$f(x) = \sum_{n=0}^{\infty} \left\{ a_n \cos \frac{n 2\pi}{T} x + b_n \sin \frac{n 2\pi}{T} x \right\},$$

it follows that $$f'(x) = \left\{ \sum_{n=0}^{\infty} \frac{\sin \frac{n \pi \Delta x}{T}}{\frac{n \pi \Delta x}{T}} \right\} f(x)$$

The response of the light defocussed $\Delta x$ is as follows:

$$\sum_{n=0}^{\infty} \frac{\sin \frac{n \pi \Delta x}{T}}{\frac{n \pi \Delta x}{T}}$$

Figure 5:
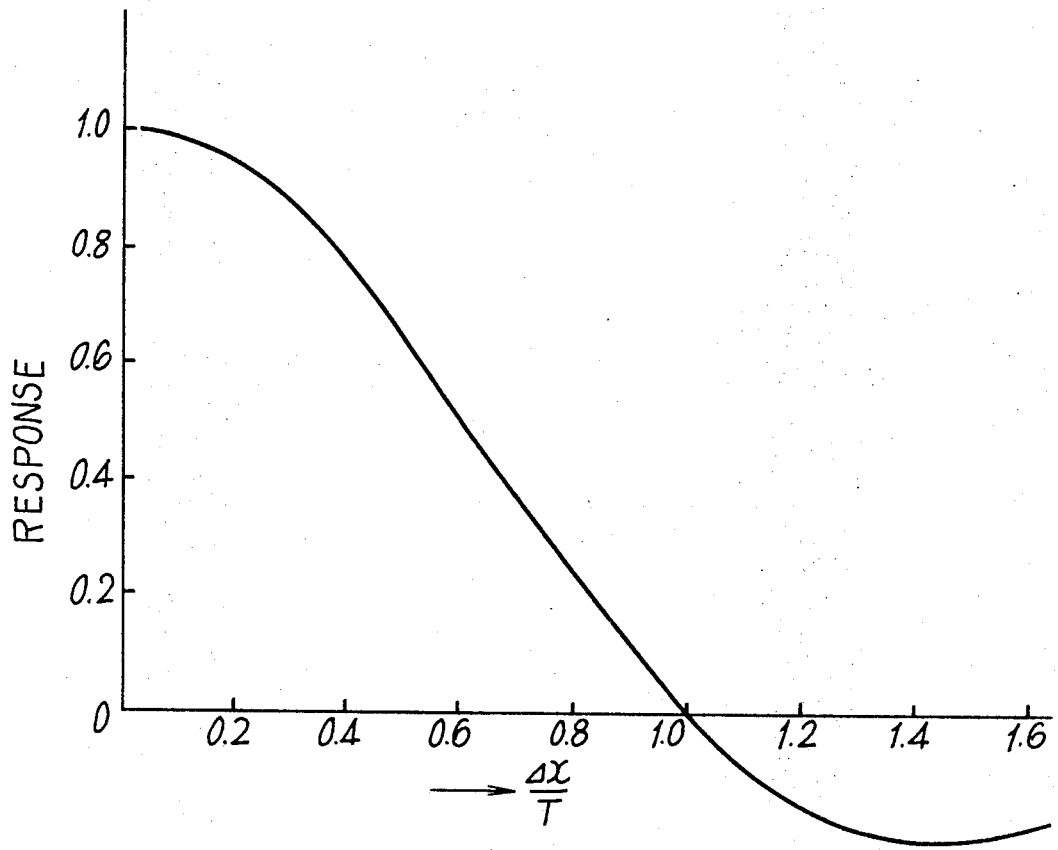
FIG. 5 is a graph showing the relationship of response characteristic to the defocusing of the image of the color filter.

The response function of the fundamental wave is shown in FIG. 5. Under the influence of the defocusing $\Delta a_M$ of the magenta color filter 9M the response of the fundamental wave is as follows:

$$\frac{\sin \frac{\pi \Delta x}{T}}{\frac{\pi \Delta x}{T}} = \frac{\sin \pi \frac{a}{A} \left( 1 - \frac{m}{n} \right)}{\frac{a}{A} \left( 1 - \frac{m}{n} \right)}$$

If $m = 3$, $n = 5$ and $\frac{a}{A} = \frac{2}{3}$, then $\frac{a}{A} \left( 1 - \frac{m}{n} \right) = 0.27$ and the response is 90 percent of the ideal one. As to the cyan color filter 7C, $m$ is 4 and $n$ is 5 in the above equation, and accordingly it follows that $$\frac{a}{A} \left( 1 - \frac{m}{n} \right) = 0.13$$

and the response in this case is 97 percent of the ideal response, as is apparent from FIG. 5.

In short, only one of the striped color filters is accurately focused into an image on layer 3, while the images of the other filters are a little out of focus, but the defocusing of the images of such other filters hardly causes loss in the quantity of light and the quality of light exceeds 90 percent of that obtainable if there was no defocusing.

In a modification of the above-described embodiment, the pitch of the color filter regions of the color filters may be made twice that of the cylindrical lenses of the lens screen and, in that case, the yellow, cyan and magenta color filters 7Y, 7C and 7M are respectively disposed at distances 11xb, 9xb and 7xb from the lens screen, so that the resulting frequencies of the blue, red and green color signals are $5.5f_L$, $4.5f_L$ and $3.5f_L$, respectively.

In all of the above, the color filter regions of the color filters 7Y, 7C and 7M have been formed with the same pitch, but that is not always necessary. For example, as illustrated in FIG. 6, the pitch of the color filter regions of the yellow and magenta color filters 7Y and 7M are the same as that of the cylindrical lenses of lens screen 8, and these color filters are respectively disposed at distances 5xb and 3xb from lens screen 8, whereas the pitch of the cyan color filter 7C is one-half of that of the color filter regions of the magenta color filter 7M and the cyan color filter is placed at a distance of 2xb from lens screen 8. In such case, the images 9Y, 9M and 9C of the color filters are as depicted in FIG. 6, and the resulting blue, green and red color signals have frequencies of $5fL$, $3fL$ and $4fL$, respectively.

Further, the color filters need not always be separated from one another. For example, as shown in FIG. 7, the cyan and magenta color filters 7C and 7M may be respectively positioned at distances of $3xb$ and $2xb$ from lens screen 8 and the pitch of their color filter regions may be the same as that of the cylindrical lenses of lens screen 8, whereas the yellow color filter 7Y is disposed at the same position as the magenta color filter 7M, that is, at a distance of $2xb$ from lens screen 8. When the color filters are positioned as shown on FIG. 7 and the pitch of the color filter regions of filter 7Y is one-third of that of the cylindrical lenses of lens screen 8, the resulting red, green and blue signals have frequencies of $3fL$, $2fL$ and $4fL$, respectively. It is also to be noted that the color filters need not always be placed at distances from lens screen 8 that are integral multiples of the distance $b$ from lens screen 8 to photoconductive layer 3, for example, they may be positioned at a distance of $1.5xb$ from the lens screen.

When the pitches of the filter regions of the color filters are made equal to one another, as in the embodiment of FIG. 2, the color filters can be produced with ease. Further, since a plurality of images of the filter regions of the color filters are projected onto each cylindrical lens for every pitch thereof, the pitch of the filter regions of the color filters may be made larger than that of the cylindrical lenses so as to further facilitate the fabrication of the filters.

Thus, for example, as shown on FIG. 8, the pitch of the filter regions of a color filter 7 can be made twice as large as the pitch A of the cylindrical lenses of screen 8 if the images of the color filters through adjacent cylindrical lenses are overlapped on layer 3 to maintain the pitches of the images of the filter regions of the color filters focused on the photoconductive layer 3. In the illustrated example, the color filter 7 is placed at a distance $4xb$ from lens screen 8 and the pitch of the filter regions of the filter is twice the pitch A of the cylindrical lenses of the lens screen and the width of the filter regions is 1/2 A, so that an image produced by a cylindrical lens $L_1$ lies between the lens $L_1$ and lenses adjacent thereto, as indicated at $9a$, and an image produced by the lens $L_2$ lies between the lens $L_2$ and those adjacent thereto as indicated by $9b$. Thus, the ratio of the pitch of the resulting images of the filter regions to the pitch of the filter regions is reduced to one-half of that in the previously described examples with the result that the pitch of the resulting images of the filter regions is equal to that where the pitch of the filter regions of the filter is A. Enlargement of the spacing between the filter regions of the color filters, as described in connection with FIG. 8, substantially avoids diffraction caused by the filter regions serving as gratings and decreases the interference fringes, so that a picture of high luminance can be produced.

In the foregoing, the ratio of the pitches of the cylindrical lenses of the lens screen and of the filter regions of each striped color filter has been an integer or whole number, but this is not always required. As shown on FIG. 9, the images of the filter regions of color filter 7 through a cylindrical lens $L_0$ are formed on the photoconductive layer 3 at intervals defined by the following equation:

$$x = d(b/l)W \quad (4)$$

where $x$ is a distance in the direction of array of the cylindrical lenses from a point 0 where a line from the center of filter region $F_0$ passing through the center of the cylindrical lens $L_0$ crosses the layer 3, $W=0, \pm1, \pm2, \pm3,......$ and $d$ is the pitch of the filter regions of the filter. Further, the image of the filter region $F_0$ formed by a cylindrical lens $L_n$ which is $n$ lenses away from lens $L_0$ lies on the photoconductive layer 3 at a point defined by the following equation:

$$x = n \cdot A(l+b/l) \quad (5)$$

$n=0, \pm1, \pm2, \pm3......$ Consequently, the images of the filter regions of striped color filter 7 through the cylindrical lens $L_n$ are focused on the photoconductive layer 3 at points defined by the following equation:

$$x = \frac{nA(l+b)}{l} - d\frac{b}{l}n' \quad (6)$$

where $n'=0, \pm1, \pm2, \pm3,......$ If the images focused by the cylindrical lenses $L_n$ and $L_0$ agree with each other, the images overlap each other and a cyclic image is formed. To this end, the above equations (4) and (6) must be equal to each other. Accordingly, it follows that $$d\frac{b}{l}W = \frac{nA(l+b)}{l} \pm d\frac{b}{l}n' \quad (7)$$

This equation (7) is deformed as follows:

$$\frac{nA(l+b)}{l} = d\frac{b}{l}(W \pm n') = d\frac{b}{l}\gamma$$

in which $\delta = W \pm n'$, and $\delta = 0, \pm1, \pm2, \pm3,......$ $$\frac{n(l+b)}{b} = \frac{d}{A}\gamma \quad (8)$$

Accordingly, if there is a value of $\delta$ (gamma) which satisfies equation (8) when $n$ is a desired integer, images of the filter regions having a pitch of $d(b/l)$ can be produced. Equation (8) implies $$1 + \frac{l}{b} = \frac{d}{A}\gamma' \quad (9)$$

where $\delta' = 0, \pm1, \pm2, \pm3......$

FIG. 10 is a graph in which the right- and left-hand sides of equation (9) are plotted as functions of $\frac{l}{b}$ and $\delta'$ which are expressed on the abscissa. In FIG. 10, since there is present a solution in $\delta' = 0, 1, 2, 3....$, however, in the case of a convex lens, $l$ is required to exceed $b$ for producing a real image of the filter and accordingly $\delta'$ should be $1, 2, 3.....$ When, for example, the value of $\delta'$ is selected to be 3, the value $P_1$ of $l/b$ is selected such that $d/A \delta'$ is equal to $1+l/b$. In other words, if $l/b$ is selected to be $P_1$, that is, 3.8 in the example being given, an image of the color filter having a pitch ($d \cdot b/l$ $d/3.8$ can be produced. Similarly, if $\delta'$ is selected to be 2, the value $P_2$ of $l/b$ is selected to be 2.25, as shown, Thus, so long as equation (9) is satisfied, $l/b$ need not be an integer and neither need the pitch $d/P$ be an integer.

When the distances between the color filter, its image and the lens screen have been selected and the pitches of the color filter regions and the cylindrical lenses have been selected in such a manner as to satisfy the equation (9), even if certain of the color filter regions are removed in a regular pattern, for example, the filter regions $F_1, F_2, F_4, F_5, F_7, F_8,.....$ in FIG. 9, images of the remaining filter regions can be obtained with an image pitch of $db/l$. This can readily be understood from FIG. 8 and the foregoing description given in connection therewith.

In the arrangement according to the present invention the color filters are disposed relatively close to lens screen 8, so that the image focused on the photoconductive layer is not affected by replacement of objective lens 2. When the color filter is placed at the forward focus position of the objective lens, as previously proposed, that is, at the telecentric position thereof, alignment of the stripes of the color filters with the cylindrical lenses of the lens screen is required to be achieved with high accuracy, for example, within one degree, and when the stripes are even slightly out of alignment due to mechanical vibration, good color signals cannot be obtained. Further, in the previously proposed arrangement, the images of the color filters become distorted on account of the aberration of the objective lens to deteriorate image focusing.

However, the apparatus of the present invention is free from such defects and is capable of withstanding mechanical vibration and while still providing a good picture.

Although the luminance signal component is obtained with the same image pickup tube as the other color signals in the above-described embodiments of the invention, this is not a necessary condition. For example, a portion of the projected light may be picked-up ahead of the color filters and a real image of the object may be formed by the picked-up light on an image pickup tube provided exclusively for the luminance signal. In such case, the lens screen may be formed of an assembly of cylindrical lenses with no flat, nonlens portions being provided therebetween, for example, as shown on FIG. 7.

Having described specific embodiments of the invention with reference to the accompanying drawings, it is to be understood that the invention is not limited to those precise embodiments, and that various changes and modifications may be effected therein by one skilled in the art without departing from the scope or spirit of the invention.

What I claim is:

1. In a color video signal generating apparatus having image pickup means with a photosensitive conversion layer, and objective lens means for projecting an image of an object to be reproduced onto said layer; a plurality of color filters having parallel stripelike filter regions of different wavelength band characteristics and a lens screen having a plurality of parallel cylindrical lenses extending in the same direction as said stripelike filter regions, said color filters and said lens screen being arranged in sequence between said objective lens means and said conversion layer along the optical axis of light from the object so that said cylindrical lenses project images of said stripelike filter regions onto said layer, each of said color filters being disposed to satisfy the equation $$1 + (l/b = d/A)\delta'$$

in which $l$ is the distance from said lens screen to the respective color filter, $b$ is the distance from said lens screen to said conversion layer, $d$ is the pitch of said stripelike filter regions of the respective filter, $A$ is the pitch of said cylindrical lenses and $\delta'$ is a positive integer, and the values of $d$ and $l$ for each of said color filters being further selected so that the values of $db./l$ for the several color filters are all different, thereby to achieve different pitches for the images of the respective filter regions.

2. A color video signal generating apparatus according to claim 1, in which at least two of said color filters are disposed at different distances from said lens screen.

3. A color video signal generating apparatus according to claim 2, in which said distance to said lens screen from the one of said two color filters having images of its filter regions projected with the smallest of said pitches for the images is dimensioned to cause said cylindrical lenses to accurately focus the respective images on said layer.

4. A color video signal generating apparatus according to claim 1, in which at least a first one of said color filters has said filter regions thereon with a pitch different from the pitch of the filter regions on a second one of said color filters.

5. A color video signal generating apparatus according to claim 4, in which the color filters having the filter regions thereon with different pitches are disposed at the same distance from said lens screen.

6. A color video signal generating apparatus according to claim 5, in which a third one of said color filters has the filter regions thereon with a pitch which is the same as that of the filer regions on one of said color filters disposed at said same distance from the screen, and said third color filter is at a distance from said lens screen that is different from said same distance.

7. A color video signal generating apparatus according to claim 1, in which cylindrical lenses of the lens screen are spaced from each other by intervening flat portions of the lens screen so that a luminance signal can also be obtained from said image pickup means.

8. A color video signal generating apparatus according to claim 1, in which all of said color filters are at different distances from said lens screen, and the pitch of said filter regions of the color filters is an integral number of times larger than said pitch of the cylindrical lenses.